United States Patent

Hugenroth et al.

[11] Patent Number: 6,132,191
[45] Date of Patent: Oct. 17, 2000

[54] CHECK VALVE FOR SCROLL COMPRESSOR

[75] Inventors: Jason Hugenroth, Arkadelphia, Ark.; Dennis Janda, Janesville, Wis.; Gene Fields, Arkadelphia, Ark.

[73] Assignee: Scroll Technologies, Arkadelphia, Ark.

[21] Appl. No.: 09/079,963

[22] Filed: May 15, 1998

[51] Int. Cl.[7] .................................................... F04C 18/00
[52] U.S. Cl. ..................... 418/55.1; 418/270; 137/514.5; 137/514.7; 137/220; 137/540; 137/533.31; 137/513.3
[58] Field of Search .................................. 418/55.1, 270; 137/514.5, 514.7, 220, 540, 533.31, 513.3

[56] References Cited

U.S. PATENT DOCUMENTS

| 1,322,938 | 11/1919 | Parker | 137/540 |
|---|---|---|---|
| 3,134,394 | 5/1964 | Ohta | 137/220 |
| 5,531,712 | 7/1996 | Malcolm et al. | 137/513.3 |

FOREIGN PATENT DOCUMENTS

| 0843098 | 12/1996 | European Pat. Off. | 418/270 |
|---|---|---|---|
| 408319973 | 12/1996 | Japan | 418/270 |

*Primary Examiner*—Thomas Denion
*Assistant Examiner*—Thai-Ba Trieu
*Attorney, Agent, or Firm*—Carlson, Gaskey & Olds

[57] ABSTRACT

A series of check valves are disclosed for use in a scroll compressor which control and dampen the closing of the check valve to reduce noise during rapid pressure fluctuations encountered during normal operation and to control loss of gas in a discharge passage. In one check valve, a reed valve or poppet valve is employed to control the motion of a main valve to a closed position. In another check valve, suction pressure is used to reduce the closing force of the main valve. In another check valve, the main refrigerant flow passes through a converging, diverging passage to create a relatively low pressure chamber to reduce the closing force of the main valve. In another check valve, the reverse flow from the discharge plenum either does not act to close the valve or acts on a reduced surface area.

9 Claims, 8 Drawing Sheets

CHECK VALVE FOR SCROLL COMPRESSOR

TECHNICAL FIELD OF THE INVENTION

This invention relates to scroll compressors, and in particular to an improved check valve therefore.

BACKGROUND OF THE INVENTION

The scroll compressor has become a more widely used mechanism for home and business air conditioning in recent years. In a scroll compressor, two scroll elements having cooperating scroll wraps are moved relative to each other to compress a refrigerant from a suction pressure on the low pressure side of the compressor to a discharge pressure on the high pressure side of the compressor. When scroll compressors are shut down or have power interruptions, the high pressure discharge gas tries to equalize itself with the low pressure suction gas. This can cause the compressor to run in reverse until the pressures are in equilibrium. Reverse rotation causes objectionable noise and can cause a single phase compressor to actually run powered in reverse when a power flicker is encountered. A check valve has been utilized in the discharge passage of the scroll compressor to prevent this reverse rotation.

While adequate check valves exist, they generate undesirable noise during normal operation of the scroll compressor. For most of the conditions in a scroll compressor's operating envelope, the gas is either being over compressed, or worse, under compressed. When the compressor is running at an under compression condition, the check valve sees a powerful gas pressure and velocity reversal that tends to close the valve violently during each of these reversals. These reversals can occur at nearly sixty (60) times per second during normal operation. This generates undesirable check valve noise continuously during normal operation of the scroll compressor. A need exists to develop a check valve which operates quietly during normal operation, yet closes quickly during shutdown to prevent objectionable compressor shutdown noise.

SUMMARY OF THE INVENTION

In accordance with one aspect of the present invention, a check valve is provided for use in a scroll compressor having a pair of scroll elements cooperating to compress a refrigerant into a discharge passage. The check valve includes a body mounted in the discharge passage and a main valve mounted in the body for movement between an open position permitting refrigerant flow through the check valve and a closed position preventing refrigerant flow through the check valve. The main valve moves to the closed position when the pressure at the inlet of the discharge passage falls below the pressure at the outlet of the discharge passage. A damping mechanism is also provided which is responsive to the pressure at the inlet of the discharge passage to control movement of the main valve to the closed position.

In accordance with another aspect of the present invention, the damping mechanism is a reed or poppet valve which can be spring assisted. In accordance with another aspect of the present invention, the damping mechanism can include exposing a portion of the main valve to suction or intermediate pressure within the compressor. In accordance with another aspect of the present invention, the damping mechanism can include use of a converging, diverging passage to create a relative vacuum exposed to a portion of the main valve.

BRIEF DESCRIPTION OF THE DRAWINGS

For a fuller understanding of the present invention, reference should now be made to the following detailed description taken in conjunction with the accompanying drawings, wherein.

DETAILED DESCRIPTION OF THE INVENTION

Figure 1:
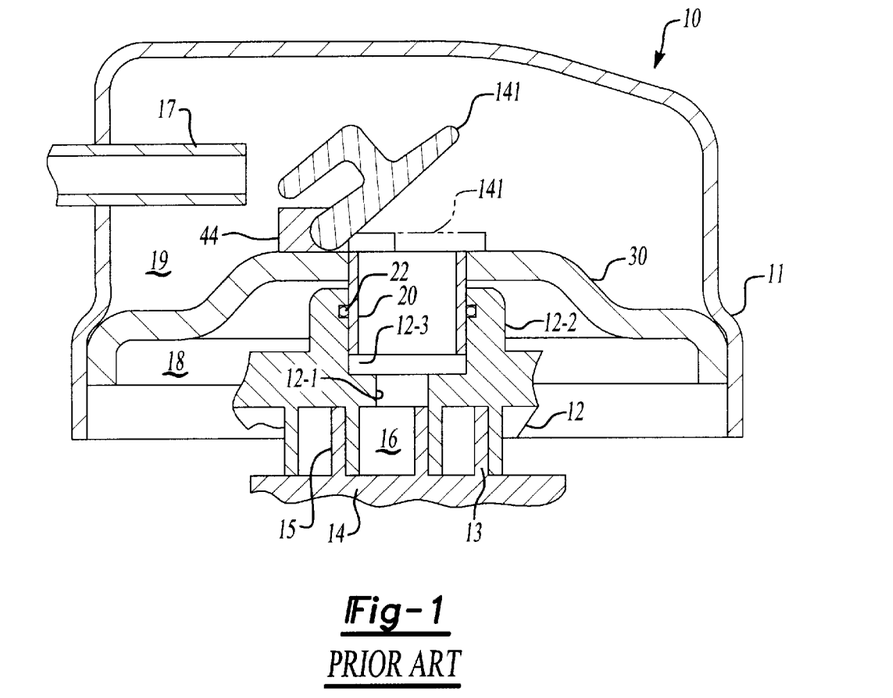
FIG. 1 is a partial vertical cross section of a scroll compressor showing a prior art check valve design.

In FIG. 1, the numeral 10 generally designates a low side hermetic scroll compressor having a shell or casing 11. A low side hermetic compressor is one in which all or most of the shell or casing is at suction pressure. A fixed scroll 12 having a wrap 13 and an orbiting scroll 14 having a wrap 15 are located in the shell or casing 11 in any suitable manner. A generally axially extending discharge port 12-1 is formed in the fixed scroll 12. The side of the fixed scroll 12 opposite wrap 13 and through which discharge port 12-1 extends includes a raised central cylindrical portion 12-2 defining counterbore 12-3 which receives sleeve 20. Sleeve 20 is sealed with bore 12-3 by suitable seal 22 and is welded or otherwise suitably sealingly secured to separator plate 30. With separator plate 30 sealed to casing 11 and fixed scroll 12 through sleeve 20 and seal 22, the interior of casing 11 is divided into a suction plenum 18 and a discharge plenum 19.

Valve member 141 is freely pivotally secured in support 44 and is in its open position, shown in full line in FIG. 1, during compressor operation and moves to the closed position, seen in dotted line, when the compressor is shut down.

In operation, high pressure gas compressed by the motion of orbiting scroll 14 relative to fixed scroll 12 exits the compression chamber 16 serially through discharge port 12-1, bore 12-3 and sleeve 20 by lifting valve member 141, which freely pivots downstream to the solid line position. Discharge 17 extends into shell 11 for discharging the compressed refrigerant from the compressor. During a shut down, the pressure in the compression pocket 16 drops, creating a sudden flow of compressed gas from discharge plenum 19 through the discharge port 12-1. The sudden flow causes the check valve 141 to slam shut into the dotted line position shown in the figure. While this type of check valve is adequate, the operating envelope of the scroll compressor includes conditions where the gases are either being over compressed, or worse, under compressed. When the compressor is running at a under-compression condition, the check valve 141 sees a powerful gas pressure and velocity reversal from discharge plenum 19 to the discharge port 12-1 and the sudden reversal of this condition will tend to oscillate the valve 141 between the closed and open position. This oscillation can occur nearly sixty (60) times a second.

The check valve such as shown in the prior art FIG. 1 is placed far enough from the discharge chamber that it does not bang shut when the compressor is running at an under compression condition. However, because they are placed so far away there is a large trapped fluid volume which results in reverse rotation at shut down. If the check valve was moved closer to the discharge chamber, then banging would occur during under compression conditions.

Further, the discharge port 12-1 and bore 12-3 contain a significant quantity of high pressure gas at shut down, which is lost as this volume is on the low pressure side of the check valve.

Figure 2:
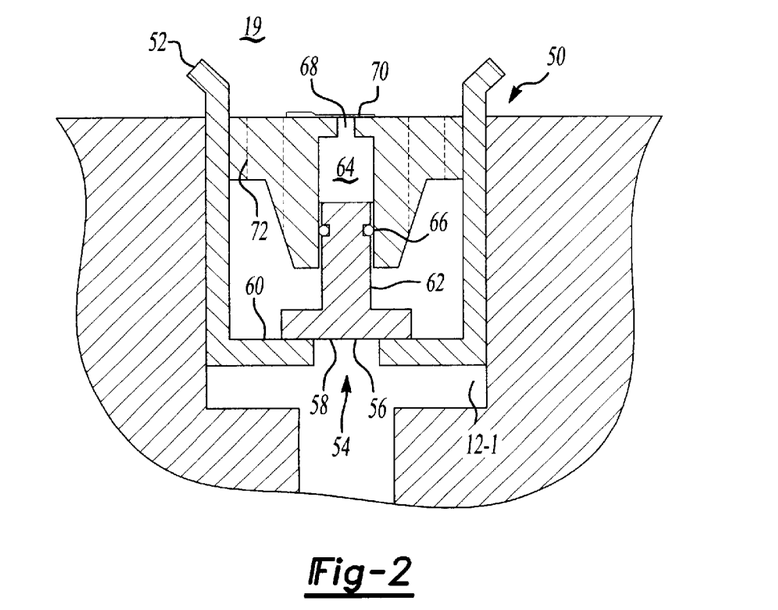
FIG. 2 is a cross-sectional view of a check valve forming a first embodiment of the present invention.

With reference now to FIG. 2, a check valve 50 will be described which forms a first embodiment of the present invention. The check valve 50 is located directly in the discharge port 12-1 and can be used in substitution for, or as a supplement to, a check valve of the type shown in FIG. 1.

The check valve 50 includes a valve body 52 which fits within the discharge port 12-1 and defines a port 54 through which the refrigerant gas must flow. A main valve 56 is supported in the valve body for movement toward and away from port 54. As shown, the main valve 56 includes a circular seal portion 58 which can be moved into sealing engagement with seal surface 60 on the valve body surrounding port 54 and a valve stem 62 which fits within a guide passage 64 in the valve body 52. A seal 66, such as an O-ring seal, seals between the valve stem 62 and the guide passage 64. The guide passage 64 opens through a port 68 into the discharge plenum 19. A reed valve 70 is mounted over the port 68 to control flow through the guide passage 64.

During normal operation, high pressure gas will be discharged from the pockets 16 formed between the scroll elements and through port 54 toward the discharge plenum 19. This flow will cause the main valve 56 to rise above the port 54, separating the seal portion 58 from the seal surface 60. The gas flow passes through passage 72 in the valve body 52 and directly into the discharge plenum 19. In this flow direction, as the main valve 56 rises upward, away from the port 54, the valve stem 62 rises in the guide passage 64. Any gas in the guide passage 64 is free to escape with little resistance past the reed valve 70 into the discharge plenum 19. Thus, the reed valve 70 has little effect during normal operation of the compressor.

During flow reversals and when a shut down occurs, the pressure between the scroll elements, and thus at the port 54, suddenly decreases, causing a significant pressure differential with the gas in the discharge plenum 19. This will cause flow to occur from the discharge plenum 19 through the passage 72, which acts on the circular seal portion 58 to drive the main valve 56 into sealing engagement with the seal surface 60 and prevent further loss of pressurized gas from the discharge plenum 19. This action is resisted or damped, however, by the closing of the reed valve 70, which prevents movement of gas from plenum 19 into the portion of guide passage 64 between the valve stem 62 and the reed valve 70. As the main valve 56 moves to the closed position, the pressure will actually be reduced in this portion of the guide passage 64, reducing the net force driving the main valve 56 to the closed position, providing a more gentle closing action with less noise than in the absence of the reed valve. The movement of the main valve 56 to the closed position is thereby damped. During flow reversals, the damping action may be sufficient to prevent the check valve from closing at all, eliminating the noise generated during normal operation by the flow reversal condition described previously. However, the damping action is calibrated so as to permit the check valve 50 to close sufficiently rapidly during actual shutdown conditions to prevent reverse operation of the scroll compressor.

Figure 3:
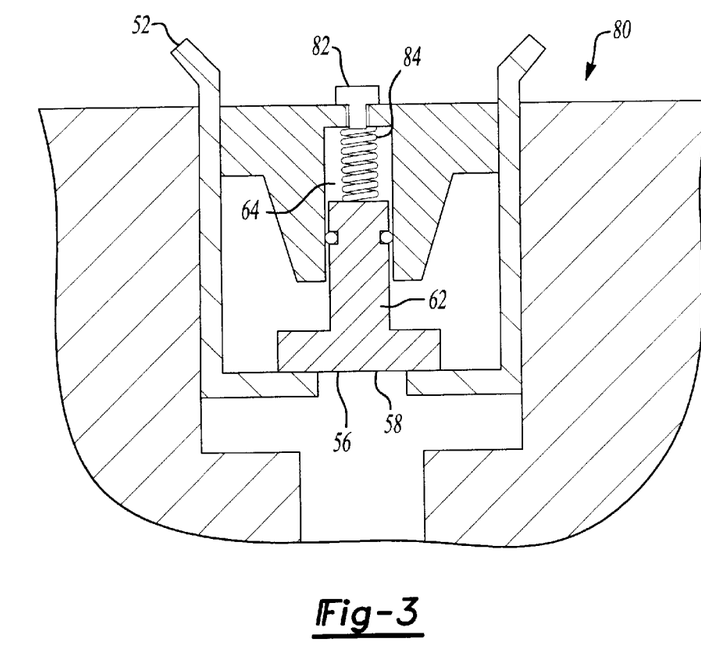
FIG. 3 is a cross-sectional view of a modification of the check valve of FIG. 2.

FIG. 3 illustrates a check valve 80 which is a modification of the check valve 50 shown in FIG. 2. Many of the elements are the same and are identified with the same reference numerals. However, a poppet valve 82 is substituted for the reed valve 70. In addition, a spring 84 can be positioned between the end of the valve stem 62 and the valve body 52 within the guide passage 64 to assist in closing the main valve 56. A similar spring 84 can be used in check valve 50, if desired.

Figure 4:
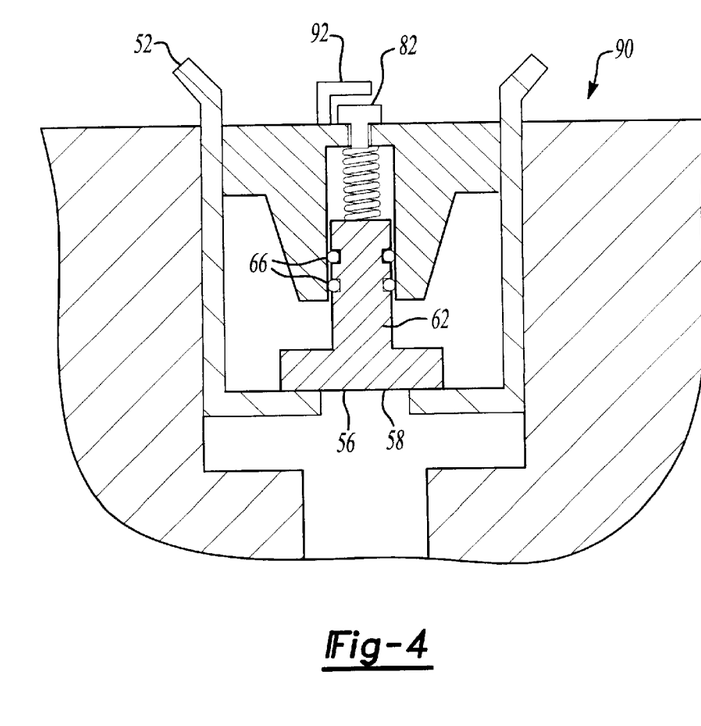
FIG. 4 is a cross-sectional view of a second modification of the check valve of FIG. 2.

FIG. 4 illustrates a check valve 90 which is a second modification of check valve 50 and has many components common thereto, identified by the same reference numerals. In check valve 90, a poppet valve stop 92 is provided to limit the upward motion of the poppet valve 82. Also, twin stem seals 66 are used.

As can be understood, the check valves described reduce the volume in the discharge port which is lost in a normal compressor at shut down and provides a check valve which does not cause excessive noise during normal operation of the scroll compressor because the damping action of the check valve as it moves to the closed position will either prevent the check valve from closing altogether during rapid pressure reversals, or reduce the impact of the check valve in moving to the closed position during those rapid reversals. This will eliminate the noise encountered in conventional check valve operation. Noise in the past has been caused by rapid opening and closing of a valve due to over and under compression of the discharge gas. The use of the reed valve 70, or poppet valve 82, retards the motion of the down stroke of the main valve 56 during under compression. For conditions of over compression, the main valve would be less restricted in its upward motion, but its length of travel and, hence, impact noise would be lessened since the poppet valve or reed valve would tend to keep the main valve in the full open position. Of course, the dimensions of the guide passage 64 and the action of the poppet or reed valves must be calibrated to still insure an adequate closing action of the check valve during an actual shutdown event.

Figure 5:
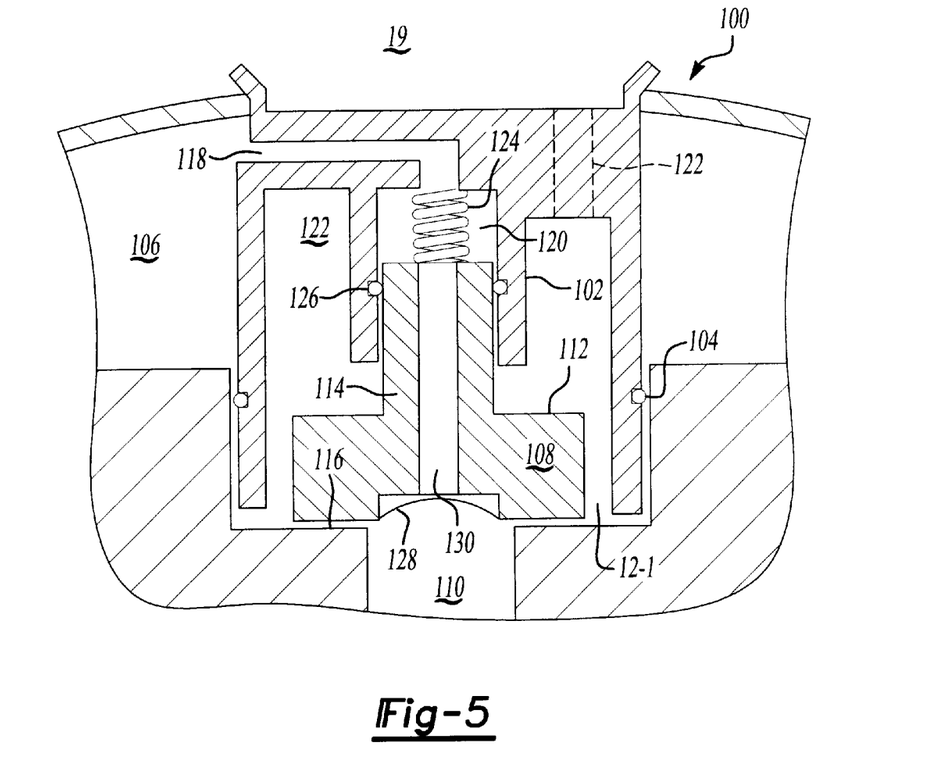
FIG. 5 is a cross-sectional view of a check valve forming a second embodiment of the present invention.

With reference now to FIG. 5, a check valve 100 forming a second embodiment of the present invention is illustrated. In check valve 100, a valve body 102 is mounted in the discharge port 12-1 and sealed thereto by a seal 104. The valve body 102 is also exposed to the suction pressure within the compressor in volume 106. A main valve 108 is mounted within the valve body 102 for movement toward and away from port 110. The main valve 108 has a seal portion 112 and a valve stem 114. The seal portion 112 can seal against seal surface 116 on the fixed scroll which surrounds port 110. Suction port 118 is formed in the valve body 102 which opens into a guide passage 120 which acts as a guide for the valve stem 114 of the main valve 108. A seal 126 seals between the valve stem 114 and the walls of guide passage 120.

Operation of check valve 100 is similar to check valve 50. During normal operation, the high pressure gas in the discharge port 12-1 will force the main valve 108 open, moving the seal portion 112 away from the seal surface 116 and allowing flow through internal main passage 122 in the valve body 102 to the discharge plenum 19. The suction pressure, acting through port 118 on the end of the valve stem 114, will assist the movement of the check valve to the open position during normal operation. A spring 124 can be employed to either retard (as shown) or assist the opening motion of main valve 108 based on design needs.

During rapid flow reversals and at shut down, the pressure at port 110 will drop suddenly, causing the pressure in plenum 19 to act on the back side of the circular seal portion 112 and drive the main valve 108 to the closed position to prevent further reverse flow from the discharge plenum 19. The end of the valve stem 114, however, will continue to be only at the suction pressure, and this will reduce and dampen the driving force closing the main valve 108, reducing the impact, and therefore the noise, of the valve closing.

If desired, the check valve 100 can incorporate a thermal valve 128 which is temperature sensitive. At a normal operating temperature, the thermal valve will close a passage 130 through the main valve 108, allowing normal operation. However, if the compressor overheats, the thermal valve 128 will deform away from the passage 130, allowing high pressure flow to pass through passage 130 directly into the suction chamber of the compressor.

Figure 6:
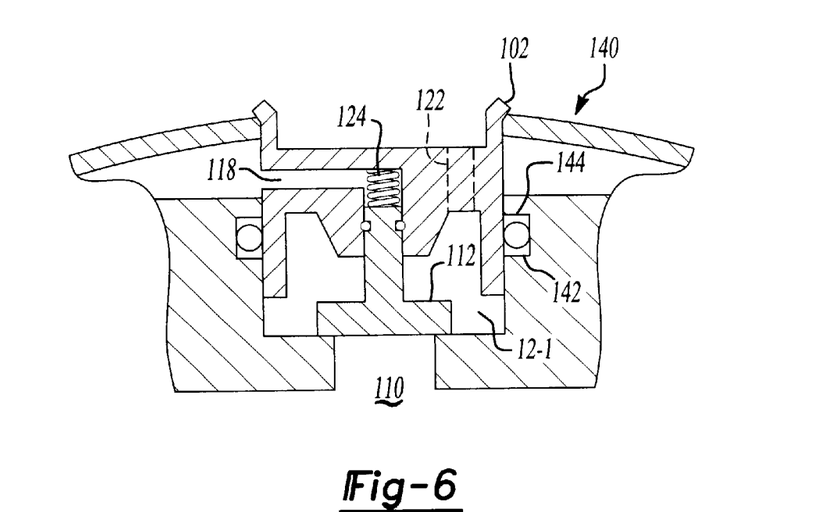
FIG. 6 is a cross-sectional view of a first modification of the check valve of FIG. 5.

With reference to FIG. 6, a check valve 140 forming a first modification of check valve 100 is illustrated. Many components of check valve 140 are the same as check valve 100 and are identified by the same reference numerals. Check valve 140 has an O-ring 142 mounted within an annular groove 144 in the wall of the discharge port 12-1 to seal between the fixed scroll and the valve body 102.

Figure 7:
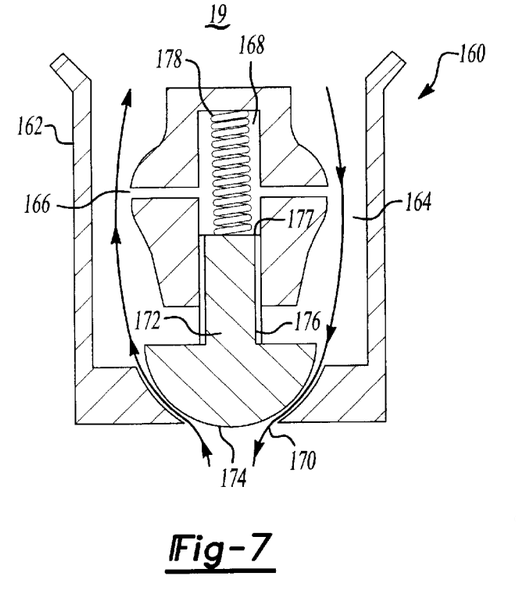
FIG. 7 is a cross-sectional view of a check valve forming a third embodiment of the present invention.

With reference now to FIG. 7, a check valve 160 forming a third embodiment of the present invention is illustrated. The check valve 160 has a valve body 162 which defines a converging/diverging passage 164 therethrough. One or more ports 166 extend from the narrowest portion of passage 164 into a guide passage 168 within the valve body.

A port 170 is formed at one end of the valve body for flow of pressurized fluid from the scroll elements. A main valve 172 controls the flow through the port 170 and includes a seal portion 174 and a valve stem 176. The valve stem 176 is received in the guide passage 168 and either closely fit thereto or sealed by a seal.

In normal operation, the high pressure gas discharged from between the scroll elements will force the main valve 172 away from the port 170 to allow flow through the passage 164 into the discharge plenum 19. In flowing through the converging, diverging passage 164, Bernoulli's effect creates a relative vacuum or lower pressure at the minimum diameter portion of the passage 164 at ports 166. Thus, the pressure within the guide passage 168 will be maintained at a relatively lower pressure. During rapid flow reversal and at shut down, the reverse flow of high pressure gas from the discharge plenum 19 will drive the main valve 172 to the closed position to seal port 170. However, the relative lower pressure acting on the end 177 of the valve stem 176 will reduce this driving force, and thus the noise of the closing action. A spring 178 can be used in guide passage 168 to urge the main valve 172 closed.

Figure 8:
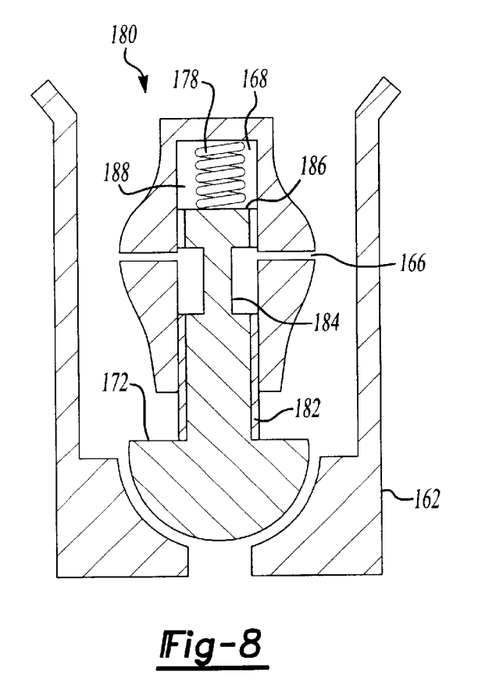
FIG. 8 is a cross-sectional view of a first modification of the check valve of FIG. 7.

With reference to FIG. 8, a check valve 180 is illustrated which is a modification of check valve 160. Components which are the same are numbered with the same reference numerals. The check valve 180 includes a modified valve stem 182 which has a reduced diameter portion 184 and a piston end 186. Reduced diameter portion 184 prevents any portion of main valve 172 from covering the vents 166 as the main valve 172 moves between its limits of motion. The valve stem 182 is a close fit with the walls of the guide passage 168 but permits gas at ports 166 to enter a chamber 188 to act on end 186. Use of the chamber 188 will modify the opening and closing action of the main valve 172. An optional spring 178 can also be used as shown in phantom line in FIG. 8.

The Bernoulli effect created by the converging, diverging passage will create a low pressure area at ports 166 and on the end of valve stem 176 in check valve 160 for flow in both directions through the check valve and will always tend to open the valve. Therefore, for reverse flow, the valve motion is retarded while allowing it to open freely for forward flow. The Bernoulli effect in check valve 180 will reduce the pressure in chamber 188 to reduce the closing force on the valve.

Figure 9:
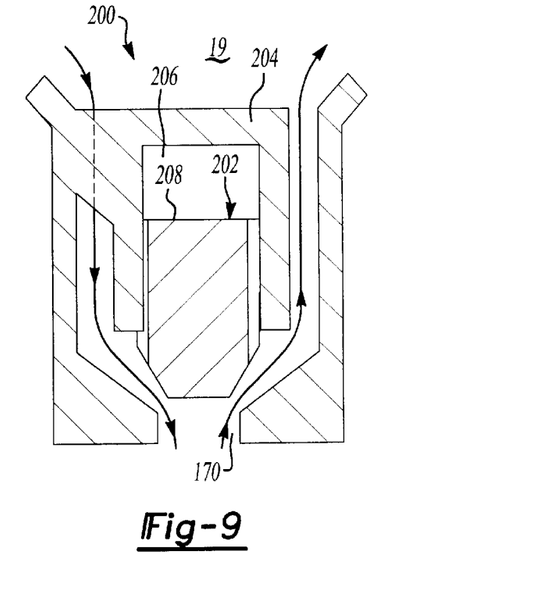
FIG. 9 is a cross-sectional view of a second modification of the check valve of FIG. 7.

FIG. 9 illustrates a check valve 200 which is a second modification of the check valve 160. In check valve 200, the main valve 202 defines no projected area in the plane perpendicular the reverse flow direction. However, gas slowly passes between the mating surfaces of main valve 202 and the valve body 204 into chamber 206 behind the end 208 of main valve 202 to provide a closing force. By not having flow impinging on the main valve 202 during reverse flow, the closing force is reduced, thereby preventing valve closure too rapidly.

Figure 10:
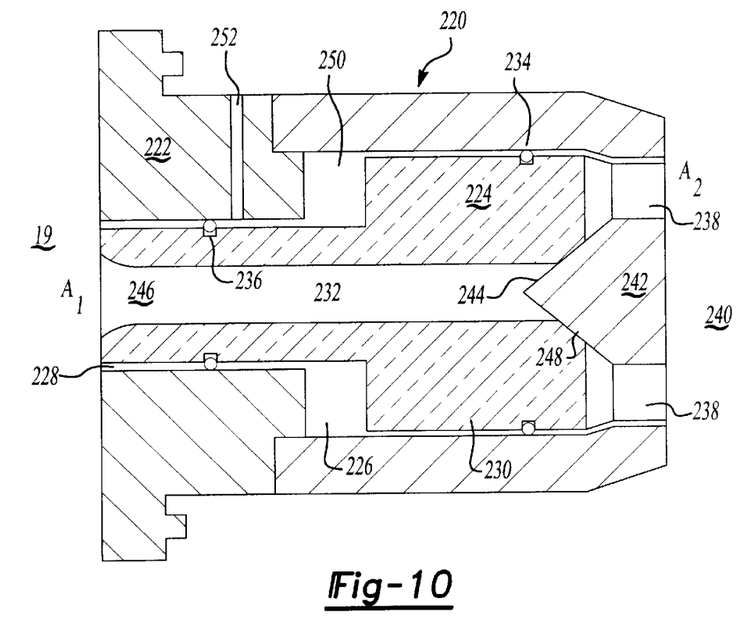
FIG. 10 is a cross-sectional view of a check valve forming a fourth embodiment of the present invention.

With reference to FIG. 10, a check valve 220 forming a fourth embodiment of the present invention is illustrated. Check valve 220 includes a valve body 222 and a main valve 224. The valve body 222 has a large diameter passage 226 and a small diameter passage 228 which combine to form a through passage through the valve body 222. The main valve 224 similarly has a large piston 230 and a small piston 232 which are received in passages 226 and 228, respectively. A seal 234 seals between the large piston 230 and the walls of the large diameter passage 226. A seal 236 seals between the small piston 232 and the surface of the small diameter passage 228. A series of ports 238 distributed in an annular distribution at the inlet end 240 of the valve body permit high pressure gas from the scroll elements into the passage 226. At the center of the inlet 240 is a seal element 242 defining a conical seal surface 244. The main valve 224 has a passage 246 formed therethrough with a seal surface 248 at the entry end.

During normal operation, high pressure gas from the scroll elements will enter ports 238 and act on the end of the large piston 230 to drive the piston to the left, as seen in FIG. 10. This will move seal surface 248 away from seal surface 244, allowing the high pressure gas to flow through the passage 246 into the discharge plenum 19. A chamber 250 defined between the pistons 230 and 232 and the large diameter passage 226 can either be isolated to provide a pressure acting to close the main valve or can be connected through a port 252 to suction pressure, as illustrated. During rapid flow reversals and at shut down, the force of the gas in discharge plenum 19 will act on the surface area at the end of the small piston 232 to close the valve. The pressure within the chamber 250 will act to retard this motion if it is maintained at the suction pressure. If desired, a spring can be used to assist in closing the valve as well.

Figure 11:
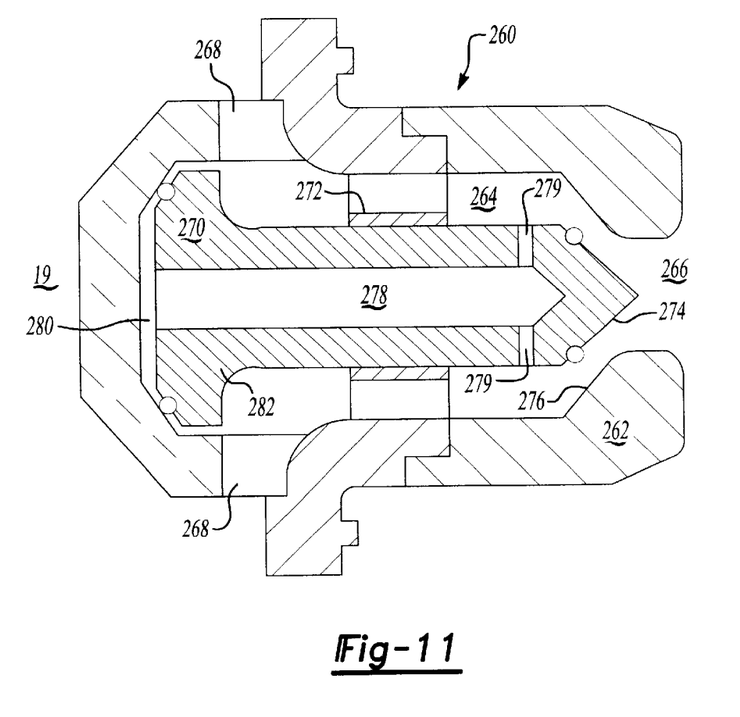
FIG. 11 is a cross-sectional view of a first modification of the check valve of FIG. 10.

FIG. 11 illustrates a check valve 260 forming a modification of check valve 220. The valve body 262 has a passage 264 which opens through port 266 at one end and through radial ports 268 at the other end thereof. A main valve 270 is guided for movement between the open and closed position within the passage by valve guide 272. The main valve 270 has a conical seal surface 274 which seals against the seal surface 276 at port 266 to close the valve. During normal operation, the valve 270 will be forced to the open position to allow flow through port 266, passage 264 and out the radial ports 268 to the discharge plenum 19. During operation, gas under pressure will pass through slots 279 near the end of the main valve having seal surface 274 and enter a passage 278 formed through the main valve 270. Gas under pressure also enters a chamber 280 formed between the end 282 of the main valve 270 and the valve body 262. At shut down, the pressure differential between the discharge plenum 19 and the scroll elements will cause a condition of relatively higher pressure at ports 268 of passage 264 than at the port 266 of passage 264. As the slots 279 are closer to the port 266, pressure will bleed from chamber 280 and passage 278, reducing the closing force on the main valve 270, thereby damping the closing action of the main valve as it moves to the closed position with conical seal surface 274 sealing against seal surface 276.

Figure 12:
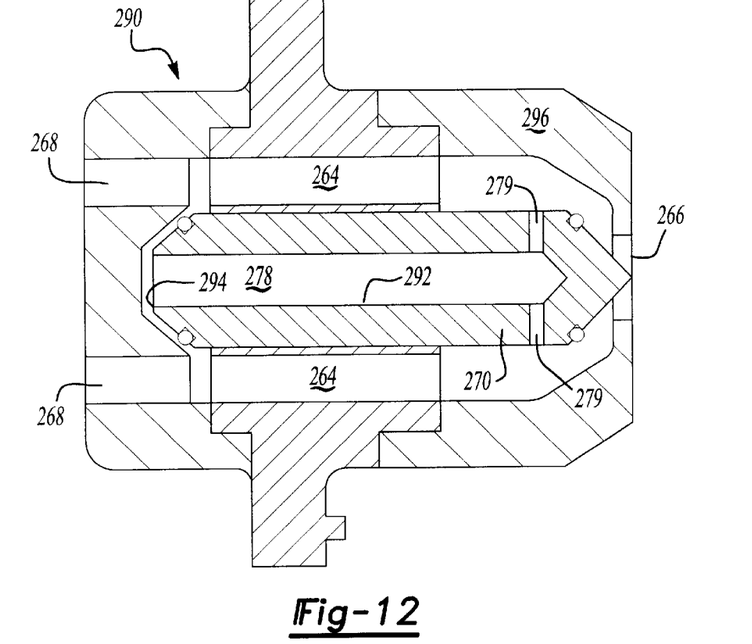
FIG. 12 is a cross-sectional view of a second modification of the check valve of FIG. 10.

With reference now to FIG. 12, a check valve 290 forming a second modification of check valve 220 is illustrated. The valve is very similar to check valve 260 with the exception that the second end 294 of the main valve 292 is of the same diameter as the remainder of the main valve and thereby has a slightly lower closing force at the beginning of closure. Initially, during closing, the ports 268 of passage 264 will be at a higher pressure than port 266. As slots 279 are much closer to port 266, the pressure will be reduced in passage 278 to reduce the initial force acting to move the main valve 270 to the closed position. The end 294 is sealed to the main body 296 in the full open position as seen in FIG. 12 and, as the valve closes, the seal is released, allowing the high pressure from the discharge plenum 19 to eventually act directly on the end 294 to assist in closing the check valve.

Figure 13:
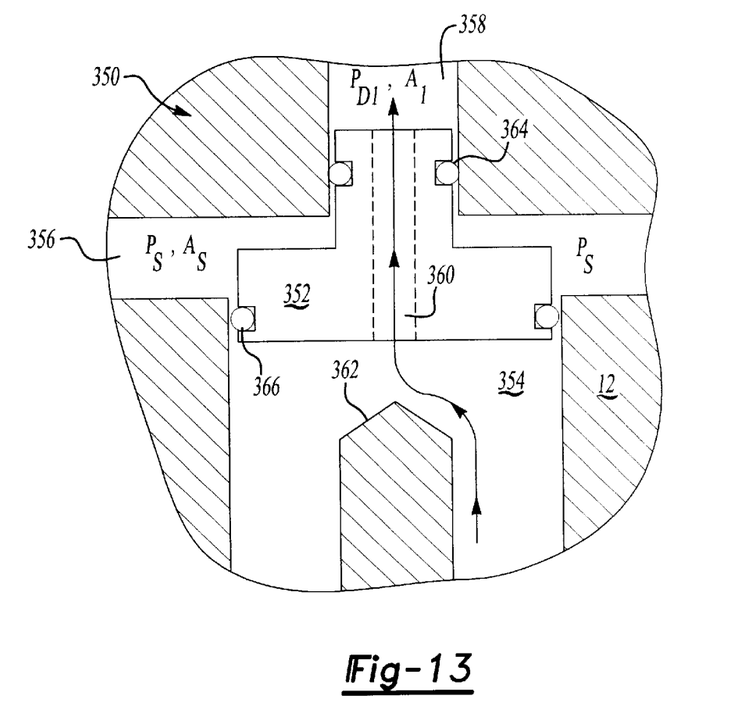
FIG. 13 is a cross-sectional view of a check valve forming a fifth embodiment of the present invention.

With reference now to FIG. 13, another embodiment of the present invention is illustrated. A check valve 350 is mounted within the fixed scroll 12, or in a separate valve housing, and includes a main valve 352. The main valve 352 is partly in a passage 354 connected with the compression pockets of the scroll elements, partly in a passage 356 connected to the suction pressure within the compressor and partly in a passage 358 leading to the discharge. A through passage 360 in main valve 352 is closed off when the main valve 352 moves along axis 368 in a first direction (downward in FIG. 13) into contact with a fixed valve seat 362 in the fixed scroll 12 to isolate passage 354 from passage 358. When main valve 352 is lifted off seat 362 (upward in FIG. 13), the discharge from the pockets can flow into passage 358. Seals 364 and 366 isolate passage 356 from the other passages at all times, while permitting the main valve 352 to move along axis 368 toward and away from seat 362.

The pressures in the three passages 354, 356 and 358 are $P_{D2}$, $P_S$ and $P_{D1}$, respectively. $P_{D2}$ is the discharge pressure from the compression pockets between the scroll members. $P_S$ is the suction pressure and $P_{D1}$ is the discharge pressure downstream of the check valve 350. The areas of the main valve 352 perpendicular axis 368 exposed to the pressure in these passages are $A_2$, $A_S$, and $A_1$, respectively.

For equilibrium on the main valve 352 i.e., no net force on main valve 352 to move it in either direction along axis 368, neglecting gravity and flow effect, the following equation applies:

$$P_{D2}A_2 = P_{D1}A_1 + P_S A_S$$

or, rewritten:

$$\frac{P_{D2}A_2}{P_S} = \frac{P_{D1}A_1}{P_S} + A_S;$$

Also, $A_2 = A_1 + A_S$

For conditions of over or undercompression the pressure in passages 354 and 358 are not equal, i.e., $P_{D2} \neq P_{D1}$, at the start of discharge. The worst case is maximum undercompression, or maximum pressure ratio, $(P/R)_{max}$ $$(P/R)_{max} = \left(\frac{P_{D1}}{P_S}\right)_{max} > \left(\frac{P_{D2}}{P_S}\right)_{\text{design pressure ratio while compressor is running} = \text{constant}}$$

The valve should stay open when this maximum pressure ratio, (P/R)max, is encountered. Setting this as the equilibrium position we get:

$$A_1\left(\frac{P_{D2}}{P_S} - \left(\frac{P_{D1}}{P_S}\right)_{max}\right) = A_S\left(1 - \frac{P_{D2}}{P_S}\right) \text{ or}$$

$$\frac{A_1}{A_S} = \frac{\left(1 - \frac{P_{D2}}{P_S}\right)}{\left(\frac{P_{D2}}{P_S} - \left(\frac{P_{D1}}{P_S}\right)_{max}\right)}$$

For the above area ratio, in all other conditions except maximum undercompression $$\left(\frac{P_{D1}}{P_S}\right) < \left(\frac{P_{D1}}{P_S}\right)_{max}$$

so:

$$\frac{P_{D2}}{P_S}A_2 > \frac{P_{D1}}{P_S}A_1 + A_S$$

and the valve wants to open (move up in FIG. 13). This covers the entire operating envelope.

At shutdown, the ratio $$\frac{P_{D2}}{P_S}$$

approaches 1 faster than $$\frac{P_{D1}}{P_S}$$

approaches 1 so:

As a result, the valve 352 shuts.

$$\frac{P_{D2}}{P_S} < \frac{P_{D1}}{P_S} A_1 + A_S$$

As an example, assume
design P/R=3=$P_{D1}$/$P_S$
$(P/R)_{max}$=7
valve 352 is in equilibrium at the worst undercompression at the maximum P/R ratio when $$\frac{A_1}{A_S} = \frac{1-3}{3-7} = 0.5$$

for a pressure ratio P/R<7:

$$\frac{P_{D2}A_2}{P_S} > \frac{P_{D1}A_1}{P_S} + A_S$$

Which means that valve 352 wants to open.
Valve 352 wants to stay open until $$\frac{P_{D2}A_2}{P_S} < \frac{P_{D1}A_1}{P_S} + A_S$$

which occurs at shutdown.
To further expand the example for refrigerant R14 at the saturation temperatures of −10/100° F. for the suction side and discharge side, which corresponds to the pressures 31.2 psi and 210.6 psi at saturation, and for $(P/R)_{max}$=7

$$\frac{P_{D2}}{31.2} = 3$$

implies $P_{D2}$=93.6 psia at worst under compression.

$$\frac{A_1}{A_S} = \frac{P_S - P_{D2}}{P_{D2} - P_{D1}} = \frac{31.2 - 93.6}{93.6 - 210.6} = .53$$

If the pressure $P_{D1}$ and $P_{D2}$ are equal, the following relationships hold:

$$\frac{P_{D2}}{P_S}A_1 + \frac{P_{D2}}{P_S}A_S = A_S + \frac{P_{D1}}{P_S}A_1, \text{ for } \frac{P_{D1}}{P_S} = \frac{P_{D2}}{P_S}$$

which implies that, for
the valve 352 will move upward, away from valve seat 362.

$$\frac{P_{D2}}{P_S} > 1$$

For over compression:

$$\frac{P_{D2}}{P_S} > \frac{P_{D1}}{P_S}$$

If valve 352 is designed to be in equilibrium when maximum P/R exists, any P/R less than the maximum will tend to open the valve.

Figure 14:
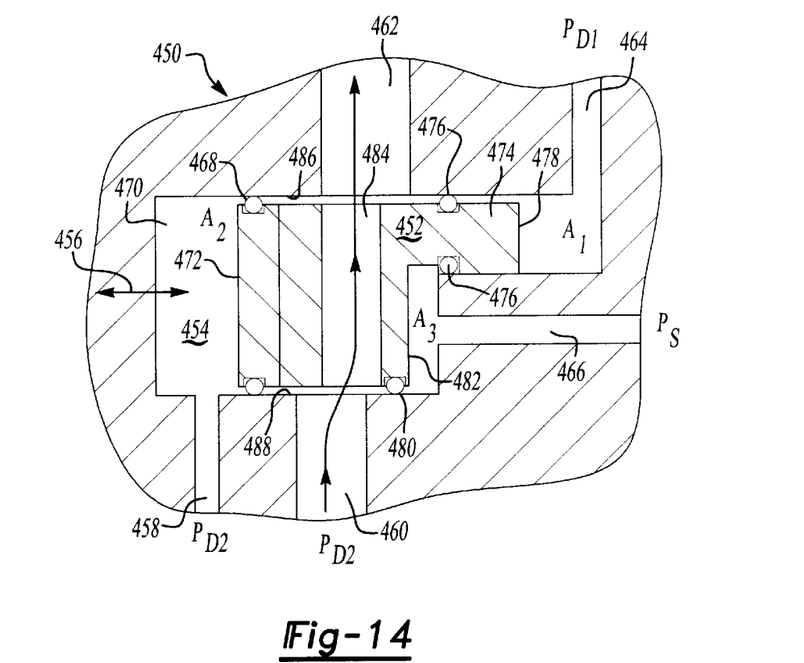
FIG. 14 is a cross-sectional view of a modification of the check valve of FIG. 13.
Figure 15:
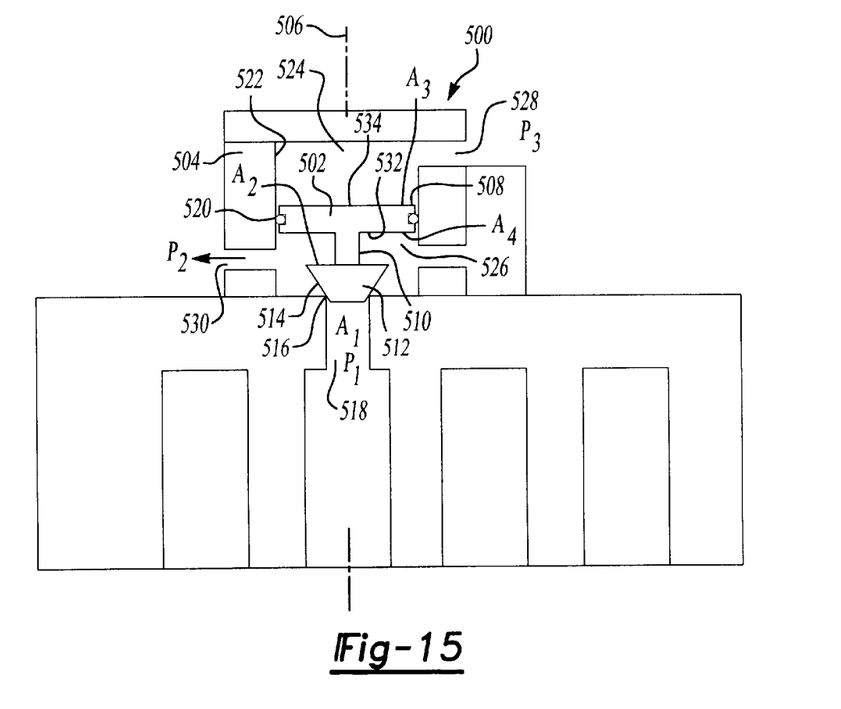
FIG. 15 is a cross-sectional view of a fifth embodiment of the present invention.

With reference now to FIG. 14, a modification of the check valve 350 is illustrated and identified as check valve 450. In this modification, the check valve 450 is mounted within the fixed scroll (or, in a valve housing) and includes a main valve 452. The main valve 452 generally lies in a chamber 454 for sliding motion from left to right, as seen in FIG. 15, in the direction of arrow 456. Two separate passages 458 and 460 open into the chamber 454 from the compression pockets between the scroll members. Two separate passages 462 and 464 open into the chamber from the discharge. A passage 466 opens into the chamber 454 from the suction side of the compressor.

A seal 468 is mounted on the valve 452 to isolate a portion 470 of the chamber 454 exposed to the pressure $P_{D2}$ in passage 458 which exerts a rightward directed force on surface 472 of the main valve 452. An extension 474 of the main valve 452 extends into the passage 464 and is sealed to the walls thereof by a seal 476 so that the end surface 478 of the extension 474 has a force exerted on it directed to the left in FIG. 14 by the pressure in passage 464 $P_{D1}$. A seal 480 is provided on the main valve 452 to isolate the pressure in passage 460 from passage 466. Thus, the surface 482 of the main valve 452 is exposed to the pressure $P_S$ in passage 466 which tends to exert a leftward moving force on the main valve 352.

A through passage 484 is formed through the main valve 452 which connects passage 460 to passage 462 when the main valve 452 is in the position shown in FIG. 15. When conditions are proper, as set forth above, if the force of pressure $P_{D1}$ acting on the area $A_1$ of surface 478 and the pressure $P_S$ acting on the area $A_S$ formed by the surface 482 exceeds the force of pressure $P_{D2}$ acting on area $A_{D2}$ formed by the surface 472, the main valve 452 will move to the left as shown in FIG. 14 until the passage 484 is aligned with surfaces 486 and 488 of the chamber, closing off the passage 484 and isolating passage 460 from passage 462. A reversed force balance will move the main valve 452 to the right to the position shown in FIG. 14 to open the valve.

With reference now to FIG. 15, another embodiment of the present invention is illustrated as check valve 500. Check valve 500 includes a main valve 502 which is reciprocal within valve body 504 along an axis 506. The main valve has a disc-like piston portion 508, a stem 510 extending from one end thereof and a seal portion 512 at the end of stem 510. The seal portion 512 has a conical seal surface 514 thereon which can move into sealing engagement with the end 516 of passage 518 connected to the compression pockets in the scroll compressor. Passage 518 is maintained at pressure $P_1$ by the operation of the scroll compressor.

Piston portion 508 includes a peripheral seal 520 which seals against the walls 522 of the valve body 504 to separate a chamber 524 from chamber 526 within the valve body 504. Passage 528 connects the chamber 524 to an intermediate pressure $P_3$ bled from a compression pocket at intermediate pressure between the suction pressure and discharge pressure. The chamber 526 connects to discharge passage 530. The chamber 526 is at pressure $P_2$.

The main valve 502 has essentially two pistons with four areas perpendicular axis 506 exposed to gas pressure. Area $A_1$ is exposed to pressure $P_1$ in the passage 518 when the valve is closed, as seen in FIG. 15. Area $A_2$ on the seal portion 512 perpendicular the axis 506 is exposed to the pressure $P_2$. Area $A_4$, the surface 532 of the piston portion 508 exposed to the chamber 526, is exposed to pressure $P_2$ as well. Area $A_3$, the area of surface 534 of the piston portion 508 perpendicular the axis 506 exposed to the chamber 524 is exposed to pressure $P_3$.

The net force on the main valve 502 will be determined by the full system conditions, rather than just the discharge condition. By a proper choice of intermediate pressure and the areas, undercompression may be controlled better. It is believed that a design of this type would also offer less starting resistance.

The closing force closing the main valve 502 is defined by the following equation:

$$\text{Closing force}=P_2A_2+P_3A_3-P_1A_1-P_2A_4$$

factoring out pressure $P_2$:

$$\text{Closing force}=P_2(A_2-A_4)-P_1A_1+P_3A_3$$

In the operation of the compressor, when the discharge pressure $P_1$ is less than the pressure $P_2$ downstream from the main valve, this indicates that pressure $P_3$ will also be low. When the discharge pressure $P_1$ is greater than the downstream pressure $P_2$, pressure $P_3$ will be higher. To dampen the closing effect, the area $A_2$ should be greater than the area $A_4$, area $A_1$ could be increased and area $A_3$ can be increased.

Figure 16:
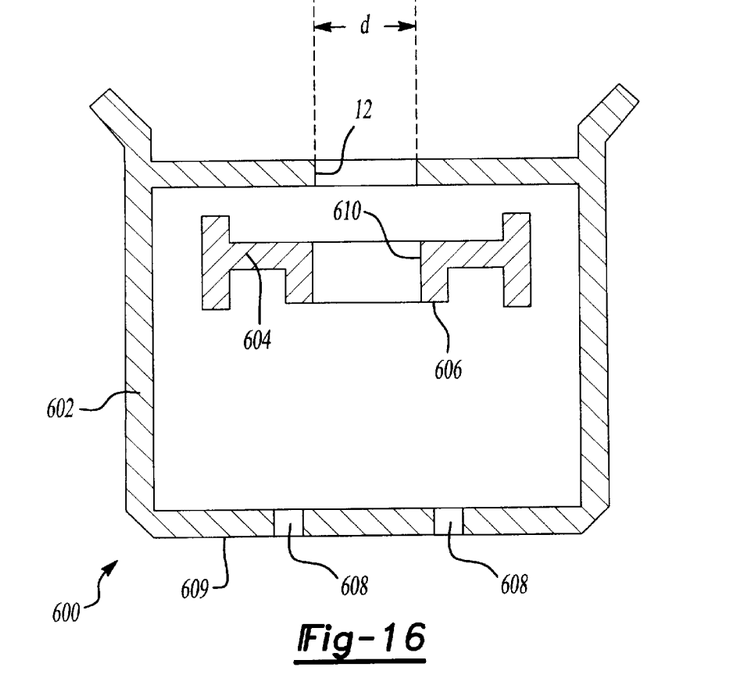
FIG. 16 is a cross-sectional view through a sixth embodiment.

FIG. 16 shows an embodiment 600 wherein the valve housing 602 receives a valve member 604. Valve 604 sealing lands 606 which are cylindrical and at inner and outer radial positions. Lands 606 sit around openings 608 extending through a bottom wall 609 of the housing 602 to seal off flow through the valve 600 during shutdown. An opening 610 through the center of the valve 604 allows flow through the housing opening 612 to discharge.

If a momentary flow reversal occurs during the high pressure ratio condition, the reverse pressure gradient tries to close the valve. However, the flow through the relatively small diameter hole 612 creates a pressure drop across the diameter d. This low pressure also acts on the top surface of the valve disc. This keeps the valve disc from moving for the duration of the pressure reversal, while still allowing the valve to quickly shut during the compressor shutdown.

Figure 17:
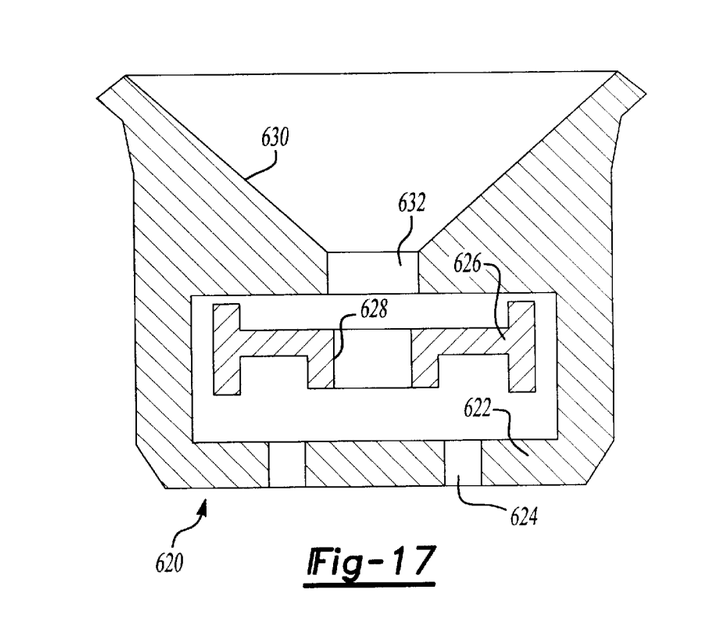
FIG. 17 is a cross-sectional view through a seventh embodiment.

FIG. 17 shows another embodiment 620 having the valve housing 622, opening 624 and a valve 626. An angled diffuser structure 630 extends from the outlet 632 in the housing 622.

As can be understood from the descriptions above, the various embodiments of the present invention are each capable of providing damped motion of a main valve to the closed position to reduce the noise presently found in scroll compressors in normal operation of the compressor as the check valve moves between the open and closed position at high frequency due to pressure fluctuations. However, the check valves will reliably close quickly in a condition of actual shutdown, preventing the noise that can occur in reverse operation. The particular degree of damping and speed of closure can be calibrated for the particular design being considered.

While several embodiments of the invention have been illustrated in the accompanying drawings, and described in the foregoing detailed description, it will be understood that the invention is not limited to the embodiments disclosed, but is capable of numerous rearrangements, modifications and substitutions of parts and elements without departing from the scope and spirit of the invention.

What is claimed is:

1. A check valve used in a scroll compressor having a pair of scroll elements cooperating to compress refrigerant toward a discharge passage comprising:

a valve body mounted in a discharge passage;

a main valve mounted in said valve body for movement between an open position permitting refrigerant flow through said check valve and a closed position preventing refrigerant flow through said check valve, said main valve moving to a closed position when a pressure at an inlet end of said discharge passage falls below a pressure at an outlet end; and a dampening element to dampen movement of said main valve to said closed position, said dampening element including passages to communicate fluid from a position downstream of said check valve to a position behind said check valve.

2. A check valve as set forth in claim 1, wherein said passages are formed within a body of said main valve.

3. A check valve as set forth in claim 1, wherein said passages extend through said valve body.

4. A check valve as set forth in claim 1, wherein a spring acts on said main valve to move said main valve to a closed position.

5. The check valve of claim 1 wherein the damping element includes a reed valve.

6. The check valve of claim 1 wherein the damping element includes a poppet valve.

7. The check valve of claim 1 wherein the scroll compressor has refrigerant at a suction pressure, the damping element exposing a portion of the main valve to suction pressure to reduce the force acting to move the main valve to the closed position.

8. The check valve of claim 1 wherein the scroll compressor has a portion of the refrigerant at a suction pressure, said chamber being exposed to the suction pressure.

9. The check valve of claim 1 wherein the main valve has a through passage therethrough.

* * * * *